United States Patent Office 2,881,081
Patented Apr. 7, 1959

2,881,081
REFRACTORY BINDER FOR METAL CASTING MOLDS

John A. Henricks, Lakewood, Ohio

No Drawing. Application June 2, 1954
Serial No. 434,067

4 Claims. (Cl. 106—38.3)

This invention relates to the investment casting of molds and is a continuation-in-part of my co-pending application Serial No. 160,577, filed May 6, 1950, now Patent No. 2,682,092, issued June 29, 1954.

For the purposes of illustration the invention is disclosed herein principally as applied to the art of precision casting by the lost wax or investment method, its application to other methods of casting to provide greater precision and better surface qualities of castings and better refractory qualities of molds being readily apparent from the illustrative examples.

In the prior art of precision casting by the lost wax or investment method, a temporary pattern is formed of wax and is invested with a plastic refractory composition which is allowed to set, after which the investment with the included wax pattern are subjected to heat in a furnace to dry the investment and melt the wax so that it can be burned out of the investment. Subsequently, the metal to be cast is poured into the mold cavity thus formed in the investment.

While plaster of Paris and magnesium oxyphosphate binders have proven adequate for wax investment casting in the dental art, the wide industrial use of this technique for stainless steel and other chromium alloys has demanded more refractory materials.

It has been found that a silicic acid sol formed by the hydrolysis of ethyl orthosilicate makes a very satisfactory binder for the refractory powders used to cast high melting ferrous alloys.

It is a principal object of this invention to form colloidal silicic acid binders for refractory powders by utilizing cheap and plentiful water glass as a source of silicic acid in place of the expensive silicic acid alcohol esters now used in the art.

It is an object of this invention to use these novel inorganic silicic acid binders along with properly proportioned refractory powders to invest wax patterns for precision casting.

It is also an object of this invention to utilize these novel binders to make refractory cores for metal casting.

I have found that a diluted water glass can be converted into a reasonably stable silicic acid sol by acidulation with phosphoric acid if an excess of phosphoric acid is used in neutralizing the alkali of the sodium silicate solution, and that such a sol makes an excellent refractory binder when additional refractory cations are provided for a delayed reaction with the free phosphoric acid used as a stabilizer for the sol. The refractory cations for reaction with the free phosphoric acid of the binder can be provided either as a basic oxide in the refractory powder mixture or as a salt of a volatile acid which will be driven off during the steps of mold drying or wax pattern burnout.

The methods are illustrated in the following examples.

Example I.—Colloidal silica binder

When a number of different metals and different types of patterns are to be cast, I prefer to use a universal investment for all molds, and then to precoat or flux those which require special treatment. An illustration of such a universal investment is:

| | Pounds |
|---|---|
| 325 mesh silica flour | 8 |
| 90 mesh silica flour | 12 |
| 80 to 100 mesh banding sand | 20 |
| Zinc oxide (accelerator) (=2.8 mols of Zn) | ½ |

Liquid A:
250 cc. 85% phosphoric acid diluted with 750 cc. water. (=3½ mols of $H_3PO_4$)

Liquid B:
600 cc. of 38%—$Na_2O$—3.2$SiO_2$ water glass (=4 mols $SiO_2$)+1.2 mols $Na_2O$
2400 cc. of water containing ½ oz. of a non-ionic wetting agent (such as a polyethylene glycol stearate and about 10 cc. of a defoamer (e.g. octyl alcohol))

The silica powders are first thoroughly blended, and then the liquids are made up. Since 85% phosphoric acid has a considerable heat of dilution, it should be mixed and cooled before investing begins. The cooled diluted phosphoric acid is put in a container with stirring means, and the diluted sodium silicate is poured in with stirring. The acid liquid A is partially neutralized by the alkali of liquid B (silicate) with the resultant formation of mono sodium phosphate and colloidal silicic acid which in turn is peptized by the excess phosphoric acid to form a colloidal binder. This reaction also gives off heat, and the mixer should be cooled for production mixing. The investment can be mixed in a cement mixer, a cake type mixer, or foundry sand muller, silica powder in each case being sifted into the mixed cool liquids.

It is important that the mixed investment material be kept in agitation during the investing, in order that the coarse particles do not settle out during the flask filling cycle. The poured investment does not require a vacuum treatment because of the wetting agent present in the liquid, but it must be tamped or vibrated around the wax pattern. The usual tamping table equipment is suitable, but any 60 cycle electrical or mechanical vibrator is satisfactory to pack the wet investment around the pattern. A three inch gummed paper collar is put around the top of the flask or an overlength paper is used as a liner, so that the excess silica gel can rise above the flask proper to eliminate shrinkage. After the investment has set up, the excess collar above the flask is cut off to leave a dense, homogeneous flask of investment. The flask should preferably set over night for best results, but it can be dewaxed in an hour or two after the collar is cut off. If a faster cycle is required, the formation of the above binder can be varied through the following ranges for a 40 pound mix:

| | 85% $H_3PO_4$, cc. | 41° Bé, "N" silicate, cc. |
|---|---|---|
| (1) Maximum concentration | 400 | 800 |
| (2) Medium concentration | 200 | 400 |
| (3) Minimum concentration | 100 | 200 |
| (4) Minimum acid concentration | 110 to 400 | |

The maximum concentration is set by the tendency to form too much silica gel, which causes mold cracking due to silica gel shrinkage when dried. The minimum concentration is determined by the loss of strength which in the case of (3) above results in a fragile mold that needs an addition of 1 to 2% of an organic binder, such as dextrin or gum arabic to give it sufficient working strength, or this weak mold may be dewaxed in a solution of a ceramic binder, then oven dried for strength. The silica sol formed by neutralizing the free alkali of the water glass is too unstable if the neutralization goes beyond the formation of mono sodium phosphate and the pH goes above pH 3.0. The most stable silica sol is formed when sufficient excess acid is used to have one mol of $NaH_2PO_4$ and one mol of $H_3PO_4$ or equivalent strong acid so in equilibrium, that the pH is kept between 1.0 and 2.0.

The function of the free acid is to peptize the silica sol, so that a minimum acid such as shown in (4) above will set up in half the time of the preferred amount in Example I, as will the substitution of a weak acid such as acetic acid for the phosphoric acid shown.

*Example II.—Colloidal silica binder containing salt of refractory amphoteric metal*

(1) Dry investment powder:
    20 pounds of 325 mesh amorphous silica
    30 pounds of 140 mesh ground quartz
    30 pounds of 80 mesh banding sand
    Mixed into uniform powder blend.

(2) Silicic acid sol binder:
    Solution A—
        717 ml. of 85% $H_3PO_4$=10 mols $H_3PO_4$
        950 ml. of water
        The acid is diluted with water and cooled.
    Solution B—
        1667 ml. of 38%—$Na_2O \cdot 3.2SiO_2$ water glass
        3333 ml. of water=3 mols $Na_2O$
                    =10 mols $S.O_2$
        The water glass is diluted with water.
    Solution C—3333 ml. of 27% $ZnCl_2$ solution=8 mols $ZnCl_2$.

As in the previous example, the diluted water glass is run into the diluted phosphoric acid with energetic stirring to form a silicic acid sol, after which addition, the zinc chloride solution is added to the silicic acid-phosphoric acid mixture, also with stirring.

The investment powders are then added to the aqueous binder liquid, using a concrete or other appropriate mixer.

The mixed binder and refractory powder is used to invest wax patterns in the same manner as Example I.

After the molds have set up, they are dewaxed either over a steam table or a low temperature oven, or by the novel aqueous dewaxing methods of my co-pending application.

The dewaxed molds are placed in a burn-out furnace and gradually brought up to a red heat during which cycle any wax residues are burned out and the various phase changes of the refractory occur, assisted by the mineralizing action of the sodium acid phosphate of the binder; and a secondary ceramic bond is formed by the action of the silicic acid and the oxyphosphate cement formed by neutralizing the free phosphoric acid with the refractory cation provided therefor.

In the preceding examples, the refractory powders were proportioned silica sand and silica flour because of the economy and relative low specific gravity of sand. It is to be pointed out that higher quality refractories such as alumina, mullite, zirconia, silicon carbide, and chromium oxide can be utilized as well as the silica products in cases where cost is permissible. Likewise, I am not limited to zinc salts as the cation agent to take up the free phosphoric acid. I have found that magnesia, aluminum hydroxide, molybdic oxide, or titanium dioxide can be used in place of the zinc oxide in the refractory powder mix to react with free phosphoric acid. Likewise, magnesium chloride, chromium acetate, aluminum nitrate, copper nitrate, or aluminum chloride, can be used to furnish cations and a volatile acid residue for the binder.

The sodium silicate used as a source of colloidal silicic acid can be any of the commercial grades that range between $1Na_2O$ to $1.5S.O_2$ and $1Na_2O$ to $4.0S.O_2$, and can be diluted with one to four parts of water so that the silica content ranges from about 5 to about 15%. When a 5% silica binder is used, it should be enhanced by 1 to 2% of an organic binder such as starch, polyvinyl alcohol, or a gum or water soluble cellulose.

Similarly various wetting agents can be used to expedite the wetting of the wax pattern by the investment mixture. The wax patterns can be pre-dipped in a slurry of these binders with silica or zirconia flour to insure a complete coverage of the wax pattern, and the precoat allowed to dry before investing with the investments given in Example I or II above.

It is apparent that when the investment is formed of colloidal hydrated acid binder, refractory powder and salt of amphoteric metal which reacts thermally with the binder during the burning out of the wax so as to render the binder more refractory, such leaves an acidic residue which acts as a residual flux. For example, when neutralized sodium silicate is used it leaves a residue of sodium acid phosphate under such conditions and the sodium acid phosphate residue is a flux for the metal to be cast. When acid chlorides, such as zinc chloride, are used in the binder, the residue is an anhydrous zinc chloride which likewise is a flux for the metal.

What I claim is:

1. A binder for refractory powders comprising colloidal silica formed by neutralizing the alkali of an aqueous sodium silicate solution with sufficient phosphoric acid to peptize the colloidal silica at a pH below 2.0.

2. A binder for refractory powders comprising colloidal silica formed by neutralizing the alkali of an aqueous sodium silicate solution with sufficient phosphoric acid to peptize the colloidal silica at a pH below 2.0 and containing a volatile acid salt of amphoteric high melting point refractory metal at least equivalent to the free phosphoric acid in the binder.

3. A binder for refractory powders comprising colloidal silica formed by neutralizing the alkali of an aqueous sodium silicate solution with at least sufficient phosphoric acid to peptize the colloidal silica at a pH below 2.0 and containing a volatile acid salt of amphoteric high melting point refractory metal selected from the group consisting of the volatile acid salts of aluminum, chromium, copper, magnesium and zinc, and said salt being present in an amount at least equivalent to the excess phosphoric acid in the binder.

4. A colloidal binder for refractories used in the casting of metals, said binder being formed by reacting an aqueous sodium silicate solution with sufficient aqueous phosphoric acid solution to neutralize the alkalinity of the sodium silicate and to peptize the resultant silica sol by sufficient excess acid to hold the pH below 2.0, said acid stabilized silica sol containing, in addition to the free acid, sodium acid, phosphate, and silica sol formed, sufficient polyvalent ion salts of volatile acids in solution to form cementitious polyvalent oxyphosphate with the free phosphoric acid of the binder when the refractory mass is dehydrated and the volatile acid driven off by heat.

References Cited in the file of this patent

UNITED STATES PATENTS

| | | |
|---|---|---|
| 1,748,315 | Stoewener | Feb. 25, 1930 |
| 1,790,272 | Leasman | Jan. 27, 1931 |
| 1,909,008 | Prange | May 16, 1933 |
| 2,072,212 | Moosdorf | Mar. 2, 1937 |
| 2,152,152 | Prosen | Mar. 28, 1939 |
| 2,391,855 | Bean | Dec. 25, 1945 |
| 2,479,504 | Moore et al. | Aug. 16, 1949 |
| 2,680,890 | Moore et al. | June 15, 1954 |
| 2,682,092 | Henricks | June 29, 1954 |